Patented July 3, 1951

2,559,167

UNITED STATES PATENT OFFICE 2,559,167

POLYSILICON OXYHALIDES

Raymond R. Myers, New York, N. Y., assignor to Monsanto Chemical Company, St. Louis, Mo., a corporation of Delaware No Drawing. Application August 21, 1946, Serial No. 692,134

5 Claims. (Cl. 23—203)

This invention relates to silicon oxyhalides. It has been recognized that silicon derivatives may be utilized to form polymeric materials and the present invention teaches how intermediates may be made for such products widely useful in industry.

It is an object of the invention to prepare new silicon compounds which may be obtained by a new method in varying degrees of polymerization and which may readily be fractioned from mixtures to obtain narrow range materials individually characterized with respect to physical properties.

Other objects and advantages of the invention will be apparent from the more detailed description hereinafter. While the process is applicable to produce polysilicon oxyhalides, including the fluorides, chlorides, bromides, and iodides generally, a specific embodiment is described with respect to the chloride compounds, since such halides are most easily available.

It is known that silicon oxychloride may be formed directly from the constituent elements, but the present method has been found to be superior and to give a product having better color, heat-stability, clarity and to have a lower viscosity, in general, than results from prior art processes. The method which is employed to produce silicon oxyhalides utilizes a process of pyrolysis or cracking of alkoxy silicon chlorides which are broken down at the temperature used. In this relationship, I may employ as starting materials the alkoxy, alkenyloxy, and aryloxy silicon chlorides having radicals such as methyl, ethyl, normal propyl, isopropyl, normal butyl, isobutyl, secondary butyl, tertiary butyl, normal amyl, normal hexyl, cyclohexyl, normal octyl, capryl, normal decyl, lauryl, myristyl, cetyl and stearyl groups, as well as unsaturated groups corresponding to the above saturated radicals. Aryl groups generally such as phenyl or naphthyl radicals and substituted modifications may also be employed.

In order that the invention may be clearly understood and readily carried into effect, some practical methods of carrying out the process according to the invention will now be described in somewhat greater detail by way of example.

Three hundred twenty-eight grams (260 cc.) of monoethyl trichlorosilicate was passed through a Vycor tube heated to 700° C. with a contact time of about 10 seconds. I prefer to use Vycor, a high silicon (96%) glass made by Corning Glass Works, because of its high resistance to heat and chemical attack, but I may also use a boro-silicate glass like Pyrex. The conduit material is not critical since the instant process is not critical as to any particular catalyst. 196 grams of crude liquid product were obtained by condensation of the effluent gases. This material yielded on fractionation 156 grams of clear liquid, boiling above 200° C. and 40 grams of unchanged ester, which was later recycled to produce further high boiling product in comparable yields. This represents an overall 85% yield based on ester consumed.

While the optimum temperature for this case has been found to be 700° C., the reaction proceeds fairly readily at 650° C. and may be carried out generally in the range of 500° C. to 1000° C., depending upon the individual compounds utilized.

While chlorides have been particularly described other alkyl silico halides, such as fluoride, bromide or iodide may be used in the same manner as here shown; however, the chlorides are the most readily available and commercially important compounds.

It is thus seen that polymeric silicon oxychlorides, $Si_nO_{n-1}Cl_{2n+2}$, may be prepared to have molecular weights in the range of 1000–2000. The table below summarizes a series of preparations and gives the molecular weights obtained by the usual Beckman cryoscopic methods.

| Method of Preparation | Mol. Weight | No. of Si Atoms |
|---|---|---|
| Pyrolysis of $SiCl_3$ O Et at 630° C | 1,430 | 12.4 |
| Pyrolysis of $SiCl_3$ O Et at 680° C | 1,110 | 9.7 |
| Pyrolysis of $SiCl_3$ O Et at 700° C | 1,200 | 10.4 |
| Pyrolysis of $SiCl_3$ O Et at 700° C | 1,400 | 12.2 |
| Pyrolysis of $SiCl_3$ O Isopropyl at 480° C | 1,740 | 15.1 |
| Pyrolysis of $SiCl_3$ O Isopropyl at 580° C | 1,190 | 10.4 |
| Oxidation of $SiCl_4$ at 960° C | 600 | 4.8 |

Molecular weights higher than 2000 may also be obtained by the instant method.

It is apparent that the instant invention obtains silicon oxychlorides at lower temperatures and with greater ease and also produces longer chain lengths of the polymeric product than does the oxidation of $SiCl_4$. It may be pointed out that lower temperatures also are conducive to the production of longer silicon polymer chain lengths.

Further work was carried out with a starting material of methyl trichlorosilicate, wherein it was found that temperatures of about 900° were necessary as compared to temperatures below 500° C. for isopropyl trichlorosilicate. The latter material resulted in products obtained at 40% conversion and 90% yield.

The compositions obtained by carrying out the process of this invention have been found to be colorless compounds free from turbidity and exceedingly stable at high temperatures. The oxyhalide products obtained by the instant invention are compounds of considerable reactivity. For example, oxychlorides of silicon have been found to be capable of forming anhydrides of aliphatic acids from the corresponding sodium salts of such fatty acids. Esters may also be formed from the present high-molecular weight silicon oxychlorides and alcohols.

The oxychlorides are useful as intermediates to obtain by simple reaction a new series of plasticizers, heat transfer fluids, fabric treating compositions and other industrially useful materials. The use of such derivatives to produce resinous compositions also makes the oxychlorides and other oxyhalides available as a hitherto unrecognized source of starting materials in this field.

The polymeric forms of silicon oxychloride here disclosed are applicable to organic substitution. In this relationship it is possible to prepare organic-silicon derivatives of the silicone type in which the polymeric structures may consist of the same structural units of silicon as are present in the oxychloride, or else may be allowed to polymerize further to high-molecular weight compositions.

While various procedures and formulae have been particularly described, these are, of course, subject to considerable variation. It will, therefore, be understood that the foregoing specific examples are given by way of illustration and that changes, omissions, additions, substitutions and/or modifications might be made within the scope of the claims without departing from the spirit of the invention, which is intended to be limited only as required by the prior art and the limitations specified in the appended claims.

What I claim is:

1. The process for preparing polymeric silicon oxychlorides which comprises pyrolyzing alkoxy silicon chlorides at a temperature in the range of about 500° C. to 1000° C.

2. The process of claim 1 characterized by the fact that the alkoxy radical is a methoxy group.

3. The process of claim 1 characterized by the fact that the alkoxy radical is an ethoxy group.

4. The process of claim 1 characterized by the fact that the alkoxy radical is an isopropoxy group.

5. The process for preparing polymeric silicon oxyhalides which comprises pyrolyzing alkoxy silicon halides at a temperature in the range of about 500° C to 1000° C.

RAYMOND R. MYERS.

REFERENCES CITED

The following references are of record in the file of this patent:

Mellor: "Inorganic and Theoretical Chemistry," vol. 6, page 975 (1925), Longmans, Green and Co., N. Y.

Schumb et al.: J. Am. Chem. Soc., vol. 63, pages 2753-5 (1941).